UNITED STATES PATENT OFFICE 2,198,367

PRODUCTION OF GLYCIDE NITRATE

Helmut Jacobi and Walter Flemming, Ludwigshafen-on-the-Rhine, Germany, assignors to I. G. Farbenindustrie Aktiengesellschaft, Frankfort-on-the-Main, Germany No Drawing. Application December 16, 1938, Serial No. 246,074. In Germany December 30, 1937

3 Claims. (Cl. 260—348)

The present invention relates to the production of glycide nitrate, a compound corresponding to the formula

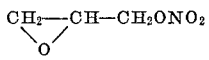

We have found that glycide nitrate, hitherto accessible only with difficulty, can be obtained in a very simple manner by treating monochlorhydrin mononitrate (containing the nitric acid ester group attached to a terminal carbon atom) in the liquid phase with agents having an alkaline reaction.

Alkaline agents especially suitable for the reaction are in particular alkali metal hydroxides and carbonates, e. g. sodium hydroxide, sodium carbonate and bicarbonate, and alkaline earth metal hydroxides; other alkaline agents, as for example ammonia, are, however, also suitable. The reaction is preferably carried out by treating the monochlorhydrin mononitrate with a solution of the alkaline agent. When using strong alkalies, as for example high percentage aqueous alkali metal hydroxide solutions, it is usually unnecessary and in fact inadvisable to heat; the latter is preferable when using more dilute alkali metal hydroxide solutions or solutions of alkali metal carbonates or alkaline earth metal hydroxides. Water preferably serves as the solvent, wherein the starting material monochlorhydrin mononitrate is soluble, but wherein the reaction product glycide nitrate is difficultly soluble. It is, therefore, especially advantageous to work up aqueous reaction mixtures, because the glycide nitrate readily separates therefrom as an oily layer. It may be purified by extracting it with organic solvents or by distillation or steam distillation. When carrying out the reaction in organic solvents care should be taken that such solvents are selected as do not react with the chlorine atom of the monochlorhydrin mononitrate, such as is the case for example with alcohols.

The amount calculated on the hydrogen chloride content of monochlorhydrin mononitrate or a slight excess of the solution of the alkaline substance may be added at once to monochlorhydrin mononitrate, or it may be added in batches or slowly in a continuous manner at about the rate at which the splitting off of hydrogen chloride progresses, care being taken that the reaction mixture does not become acid, in other words that no free hydrogen chloride or nitric acid occurs in the reaction mixture. Conversely, monochlorhydrin mononitrate may be added in batches to the alkaline solution.

It is not necessary for the monochlorhydrin mononitrate used as initial material to be pure, but solutions in which it has been prepared may also be directly used. Thus for example it is preferable to carry out the preparation of glycide nitrate according to this invention in direct conjunction with the preparation of monochlorhydrin mononitrate from epichlorhydrin and nitric acid according to our copending application Ser. No. 245,672 filed December 14, 1938. Monochlorhydrin mononitrate is produced by causing aqueous nitric acid having a specific gravity above 1.1 to act in the cold on epichlorhydrin. Presumably the compound $Cl-CH_2-CH(OH)-CH_2-O-NO_2$ is formed in preponderating amounts. In any event the nitric acid ester group is attached to a terminal carbon atom.

Since according to the structure of monochlorhydrin mononitrate, the ethylene oxide ring may be formed by the splitting off of either hydrogen chloride or nitric acid, it is surprising that glycide nitrate is mainly formed in the reaction and that epichlorhydrin is formed only to a subordinate degree. The saponification of the nitric acid ester group with the formation of a hydroxyl group leading to glycerine, which would have been expected, also does not take place.

The following examples will further illustrate how the said invention may be carried out in practice but the invention is not restricted to these examples. The parts are by weight.

Example 1

20 parts of monochlorhydrin mononitrate are slowly added to 110 parts of a boiling 10 per cent solution of sodium carbonate while stirring well. The vapors formed are distilled through a cooler, care being taken by the addition of water to the reaction mixture that the water content of the solution remains approximately constant. A good yield of glycide nitrate, which is difficulty soluble in water, separates from the aqueous distillate in the form of a heavy oil.

Example 2

20 parts of monochlorhydrin mononitrate are suspended in 50 parts of water with powerful stirring. 6 parts of 15 per cent sodium carbonate solution are then introduced and the mixture slowly heated to boiling. The vapors are liquefied in a condenser. Corresponding to the amount of water distilled off, a further 80 parts of 15 per cent sodium carbonate solution are added, care being taken that the reaction mixture always has a weak alkaline reaction. The oil driven over with the steam constitutes glycide nitrate. It collects at the bottom of the receiver and may readily be separated from the supernatant water and purified by distillation.

*Example 3*

20 parts of monochlorhydrin mononitrate are introduced into 55 parts of 10 per cent caustic soda solution at room temperature while stirring well and then stirred for half an hour. The glycide nitrate formed separates as a colorless oil in a good yield.

What we claim is:

1. A process for the production of glycide nitrate which comprises treating monochlorhydrin mononitrate, containing the nitric acid ester group attached to a terminal carbon atom, in the liquid phase with agents having an alkaline action, while maintaining a neutral to alkaline reaction.

2. A process for the production of glycide nitrate which comprises treating monochlorhydrin mononitrate, containing the nitric acid ester group attached to a terminal carbon atom, with aqueous solutions of agents having an alkaline action, while maintaining a neutral to alkaline reaction.

3. A process for the production of glycide nitrate which comprises subjecting to distillation a mixture of monochlorhydrin mononitrate, containing the nitric acid ester group attached to a terminal carbon atom, and an aqueous sodium carbonate solution, the sodium carbonate content of which is at least equivalent to the monochlorhydrin mononitrate, condensing the vapors and separating the non-aqueous layer.

HELMUT JACOBI.
WALTER FLEMMING.